United States Patent [19]

Nielsen

[11] 4,120,927
[45] Oct. 17, 1978

[54] PROCESS FOR MAKING A ONE PIECE ROTOR LINER

[75] Inventor: Steven Thomas Nielsen, Sunnyvale, Calif.

[73] Assignee: Beckman Instruments, Inc., Fullerton, Calif.

[21] Appl. No.: 684,814

[22] Filed: May 10, 1976

[51] Int. Cl.² .............................................. B29C 17/07
[52] U.S. Cl. ........................................ 264/98; 264/89;
264/296; 425/525
[58] Field of Search ........................ 264/89, 94, 96-99,
264/296; 425/DIG. 214, 522, 525, 530

[56] References Cited

U.S. PATENT DOCUMENTS 3,949,034  4/1976  Uhlig ................................ 264/296 X

FOREIGN PATENT DOCUMENTS 911,228    11/1962  United Kingdom ....................... 264/98
1,001,672  8/1965   United Kingdom ....................... 264/98

Primary Examiner—Jan H. Silbaugh
Attorney, Agent, or Firm—R. J. Steinmeyer; Ferd L. Mehlhoff; William H. May

[57] ABSTRACT

A process for making an integral one piece rotor liner for use with a high speed rotor. The liner has an inner chamber and an annular chamber designed to operate in conjunction with the rotor operation to automatically allow fluid communication between the respective chambers during centrifugation and automatically establish a seal between the respective chambers subsequent to the centrifugation operation. The process for making the one piece rotor liner generally comprises a first step of molding the liner in an intermediate elongated configuration wherein the inner chamber portion is integrally joined to and spaced from the annular chamber portion of the liner by a reversing section. The general configuration of the inner chamber is located at one end of the elongated liner shape and the general configuration of the annular chamber is located at the other end of the elongated liner. While the annular chamber portion is held in a generally fixed and rigid position, an external force is placed on the inner chamber portion of the elongated flexible liner in a direction toward the annular chamber, causing the reversing section to roll back on itself and move the inner chamber into a fixed recessed position within the annular chamber to establish the convoluted liner configuration with a dividing wall between respective inner and annular chambers.

4 Claims, 4 Drawing Figures

PROCESS FOR MAKING A ONE PIECE ROTOR LINER

BACKGROUND OF THE INVENTION

This invention relates to the field of centrifuge rotors and, more particularly, relates to a process for making a one piece rotor liner having a convolute configuration defining separate chambers which are automatically sealed and unsealed from each other during certain phases of the centrifugation operation.

In the recent development of air driven ultra high speed centrifuges, a new rotor liner configuration has been developed which establishes at least two separate and distinct chambers within the rotor that are in fluid communication with each other during the high speed centrifugation operation, but assume sealing engagement from each other subsequent to centrifugation to isolate specific centrifugated constituents of the sample mixture and to avoid remixing. Reference is made to a U.S. Pat. No. (4,056,225) issued to George N. Hein, Jr. entitled A Centrifuge for Separating Phases of a Liquid Ser. No. 681,312, filed Apr. 29, 1976 and a patent to George N. Hein U.S. Pat. No. (3,096,283) entitled a Container for Blood and Machine for Separating Precipitates from Liquid Blood Constituents. Present construction methods for making the above-referenced rotor liner requires the use of two separate pieces to obtain the tight convoluted configuration, necessitating a bonded seal between the respective pieces. The generally enclosed rotor liner has a somewhat cylindrical configuration and the presently used bonding between the two sections of the liner is normally placed along a junction located at the outer circumferential extremity of the annular chamber.

The bonded joint between the respective sections of the liner establishes a potential weak point in the liner which could be subjected to leakage or rupturing under certain conditions. It is extremely difficult to develop a dependable and reliable bonded joint which can withstand the high hydrostatic pressures of the centrifugation operation. Since the bonded joint is located at the outer diameter of the annular chamber, it is exposed to the greatest forces from the centrifugation induced pressure of fluid mixture within the annular chamber. Also, because the rotor must be in perfect balance, the presence of a bonded joint poses a potential contributing factor to possible imbalance of the rotor. Typically a small mating flange is formed on each of the pieces to accommodate the bonding process, causing an undesirable increase in the outer diameter of the annular chamber.

The necessary convolute configuration within the generally enclosed liner that establishes the separating wall between the inner chamber and the annular chamber has dictated the presently used two piece configuration. The separating wall has its upper edge in proximity with the top section of the liner, presenting a narrow annular flow path between the inner chamber and the annular chamber. The rotor liner, having only a small access hole in its top section, is not capable of being made by an injection molding process to establish a single one piece rotor liner, because it would be impossible to remove a mandrel with the rather unique convoluted configuration after forming the liner. Therefore, the liner has been designed for fabrication in two pieces with the top section being bonded to the lower section.

The interior volume of both the annular and inner chambers with respect to each other and with respect to the size of sample fluid mixture used in the centrifugation must be closely controlled. In the case of a blood sample, centrifugation is used to separate out a clear serum from the chyle and other constituents. Further, there must be enough clear serum obtained to perform the desired diagnostic tests. Otherwise, further blood samples from the patient would be required. If, for instance, the inner chamber were too small, some chyle might accumulate in the annular chamber with the clear serum. If the annular chamber were too small, not enough serum would be available for conducting the diagnostic tests. In addition, if the chambers were made too large, there may not be the proper cross flow between the chambers during centrifugation. Consequently, the respective volumes of the chambers is quite critical and it has always been considered a necessity to use the two piece construction to precisely obtain the desired volumes.

SUMMARY OF THE INVENTION

The present invention comprises a process of making an integral one piece generally enclosed rotor liner having a unique convoluted configuration for establishing separate chambers within the liner. The process comprises the molding of an intermediate elongated liner configuration having a small fluid mixture access port at one end. Formed adjacent the access port is the basic outer configuration of the larger annular chamber and adjacent the other end of the intermediate elongated configuration of the liner is the outer configuration of the small inner chamber. The two chambers are joined by a reversing section which changes orientation in order to establish the multi-chamber rotor liner.

Once the elongated intermediate form of the rotor liner has been established, the respective ends of the elongated member are forced toward each other to move the smaller chamber into a generally recessed position within the larger chamber. Since the liner is typically made from a flexible material, a supporting media is introduced through the access port to support the interior of the larger chamber, so that it will not buckle during the movement of the smaller chamber into its recessed position. The ability of the reversing section to bend back on itself through an arc of over 90° allows for the movement of the smaller chamber into its recessed position within the larger chamber.

The resultant rotor liner is constructed of one integral piece, eliminating the necessity for any bonding when two separate pieces are used. Consequently, the one piece construction alleviates the problem of having a bonded joint that must withstand the high hydrostatic pressures during centrifugation. The elimination of the bonded joint solves the problem of possible bonding material deterioration from a chemical reaction with the various sample chemicals subjected to the centrifugation operation. Further, the need for outer flanges to provide bonding surfaces is eliminated and, thereby, reduces the exterior diameter of the liner having the same interior size. Of particular importance is the fact that the elimination of the bonded joint between two pieces of a rotor liner greatly reduces a potential contributing factor to rotor imbalance. In addition, the one piece liner is molded in such a manner that its wall thicknesses will be essentially equal at circumferentially opposed locations 180° apart. This will insure proper rotor balance on its center rotational axis.

The present invention discloses a unique manner for making a generally enclosed one piece rotor liner not only having separate chambers, but also having the desired respective precise volumes in each chamber. The reversing operation to move the liner from its intermediate configuration to its multi-chamber configuration will form a liner with the requisite volume capacity in each chamber to properly accommodate the fluid sample for the centrifugation operation.

DETAILED DESCRIPTION OF THE INVENTION

Figure 1:
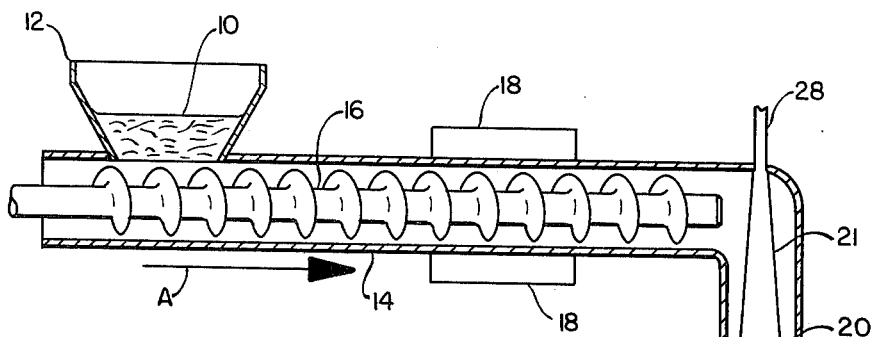
FIG. 1 is a schematic view of a molding operation to form the intermediate configuration of the rotor liner.

In the present invention for making an integral one piece rotor liner a blow molding process as shown schematically in FIG. 1 is utilized. A resin 10 of the material to be used to make the rotor liner is placed in a hopper 12 and fed into a conveyor track 14 housing a transfer mechanism 16. The resin material 10 is moved in the direction of arrow A by the transfer mechanism 16 to a position adjacent the heaters 18 which heat the resin material to a hot molten state. The molten resin is then fed to a gravity feed section 20 having a mandrel 21 around which forms a tubular configuration 22 of the material which proceeds to a position adjacent a molding mechanism 23 with separable mold sections 24 and 26. The respective mold sections 24 and 26 are moved in the direction of the arrows B and C until they join. At this point air under pressure is introduced through the conduit 28 and down through the mandrel 21 and into the interior of tubular section 22 to force the molten material out into the respective interior configurations 32 and 34 of the mold sections 24 and 26.

Figure 2:
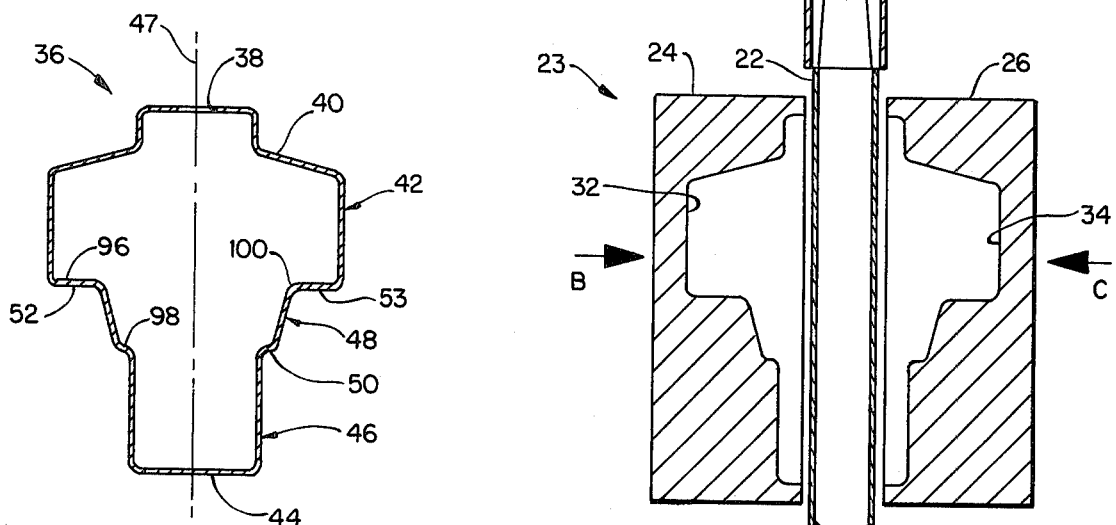
FIG. 2 is a detailed sectional view of the intermediate shape of the rotor liner produced from the molding process.

The mold sections are then separated and the intermediate elongated configuration 36 of the rotor liner as shown in FIG. 2 is extracted. The elongated configuration 36 has a small access port 38 which is designed to allow for the insertion and removal of the fluid sample prior to and after the centrifugation operation. Further, the access port 38 provides a port within the configuration to receive the air in the blow molding process of FIG. 1 to cause the molten material in its tubular configuration of 22 to extend out into the respective cavity configurations 32 and 34 of the mold sections 24 and 26.

Located adjacent the access port end 40 of the elongated rotor liner configuration 36 in FIG. 2 is an enlarged chamber portion 42 while at the other end 44 of the liner configuration 36 is a small chamber portion 46. Each of the chamber portions 42 and 46 has a general cylindrical shape with small chamber portion 46 being somewhat smaller than the diameter of the enlarged chamber portion 41. The respective chambers are concentrically aligned with the liner's rotational axis 47. Integrally connecting the small chamber portion 46 and the enlarged chamber portion 42 is a frustoconical shaped portion 48. Located adjacent the intersection of the frustoconical reversing or shifting section 48 and the small chamber portion 42 is an annular ridge 50. The reversing portion 48 joins the enlarged chamber portion 42 at its annular support area 52.

Figures 3, 4:
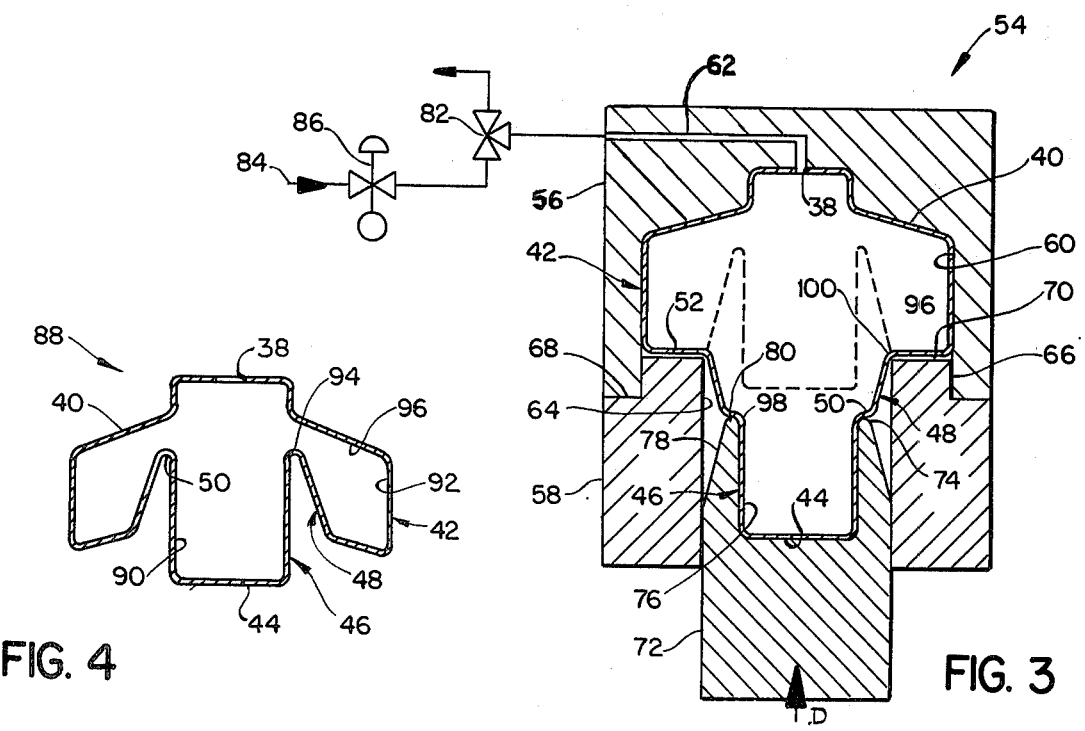
FIG. 3 is a schematic view of the reversing apparatus used to compress the liner into a convolute orientation with two separate chambers.
FIG. 4 is a detailed sectional view of the rotor liner in its desired configuration having an inner chamber and an annular chamber.

After the elongated intermediate form 36 of the rotor liner shown in FIG. 2 has been removed from the molds 24 and 26, it is placed in a reversing fixture 54 in FIG. 3 having a support section 56 and a collar section 58. The support section 56 has a cavity 60 with a configuration to accommodate the exterior configuration as the enlarged chamber portion 42 of the rotor liner. Located within the support section 56 of the reversing fixture is a fluid supply conduit or path 62 which is in alignment with the access port 38 in the rotor liner when it is positioned within the cavity 60. The collar section 58 of the reversing fixture is designed for removable engagement with the support section 56. The collar section 58 has a central aperture 64 with a raised collar 66 on its mating surface 68 surrounding the central aperture 64. The raised collar 66 has a support surface 70 which is designed to receive the support area 52 of the elongated rotor liner 36.

Slidably positioned within the central aperture 64 of the collar section 58 is a force rod 72 having an engaging end 74 with a recessed cavity 76 designed to receive the small chamber portion 46 of the elongated liner configuration. The engaging end 76 of the force rod 72 has a tapered surface 78 extending down from the cavity edge 80 in a sloping direction away from the support section 56. This sloping surface 78 is of importance during the operation of the reversing fixture 54 as will be explained hereinafter.

The air passage line 62 is in fluid communication with a three way valve 82 which receives an air supply 84 through a regulating valve 86. The three way valve 82 also acts as a relief valve during the operation of the reversing fixture to form the rotor liner in its final configuration as will be explained. FIG. 4 shows the rotor liner in its desired final configuration 88 with a central or inner chamber 90 and an outer or annular chamber 92. The two respective chambers are separated by an annular separating junction 94.

Turning to the process or method of making the one piece generally enclosed rotor liner, attention is directed first to FIG. 1, disclosing the blow molding process, as explained previously, which produces the intermediate formed product or configuration 36 of the rotor liner shown in FIG. 2. The intermediate configuration 36 is then placed within the reversing fixture 54 in FIG. 3. The collar section 58 is separated from the support section 56 to allow for the insertion of the elongated liner configuration 36 in the reversing fixture with the enlarged chamber portion 42 mated within the cavity 60 of the support section 56. The access aperture 38 located in the enlarged chamber portion 42 of the elongated rotor configuration 36 is aligned with the fluid supply passage 62. The collar section 58 is secured into engagement with the support section 56 by means not shown in such a manner that the collar 66 with its supporting surface 70 contacts the exterior surface 53 of the supporting area 52 in the enlarged chamber portion 42. The force rod 72 is inserted within the central aperture 64 of the support section 58 and moved toward the rotor liner 36 to the point where the small chamber portion 46 is received within the recessed cavity 76.

Support air is introduced through the regulating valve 86 and through the three way valve 82 into the flow path 62. The air provides internal support to the flexible or pliable rotor liner material which is preferably mdae of polyethylene or any other suitable generally chemically resistant pliable material. The support air pressure on the annular interior surface 96 of the support area 52 must be enough to hold the support section 52 in rigid fixed orientation on the support ledge 70 of the collar 66. The regulator valve 86 monitors the requisite amount of air pressure. An exterior force is applied in the direction of arrow D on the force rod 72 toward the access port end 40 of the rotor configuration 36. The smaller chamber portion 46 is completely situated within the force rod cavity 76 and, because its interior surface is supported by the air pressure from the air supply line 62, the small chamber portion 46 will retain its configuration during the movement of the force rod in the direction of arrow D. The generally frustoconical reversing section 48 of the elongated configuration 36 of the rotor liner is designed to deflect and roll back over itself, since it does not have a supporting or holding force on both sides of its surface. Consequently, as the force D moves the forcing rod 72 further toward the access port end 40, the reversing section 48 will pivot about both its junction 98 with the smaller chamber portion 46 and its junction 100 with the enlarged chamber portion 42. As the forcing rod 72 continues toward the access port end 40, the reversing section 48 will bend about the annular pivot junction 100 from an orientation angled away from the access port end 40 of the rotor liner to an orientation angled toward the access port end 40 of the liner. The angular pivoting of the reversing section 48 about the annular junction 100 is greater than 100°.

The reversing section 48 will also pivot about the annular junction 98 from an orientation toward the access port end 40 of the liner to a second orientation with respect to the annular junction 98 angled away from the access port end 40. The sloping surface 78 of the forward end 74 of the force rod 72 provides an angle forming surface on which the reversing section 48 formulates its angled or convolute orientation with respect to its junction 98 with the smaller chamber portion 46. It should be noted that the edge 80 at the opening of the cavity 76 in the forcing rod 72 engages the ridge area 50 at the junction between the reversing section 48 and the small chamber portion 46 to aid in the establishment of the bending or pivoting of the reversing section at the annular pivot junction 98. Further, the ridge 50 is also designed to establish the annular separating junction 94 in FIG. 4.

The final reversed configuration of the rotor liner 88 is shown in FIG. 4 with the establishment of an annular chamber 92 and a central or inner chamber 90. Furthermore, the reversing section 48 becomes a wall of the annular chamber 92. The annular separating junction 94 functions as a sealing area for engagement with the interior surface 96 at the access port end 40 of the liner to provide sealing between the annular and inner chambers.

In the final configuration of the rotor shown in FIG. 4 the ratio of the annular chamber volume to the inner chamber volume is important with respect to the desired amount of recoverable separated clear serum that can be extracted from the volume of the overall sample in the rotor liner. If this ratio is too large, some of the chyle might move into the annular chamber 92, making it impossible to retain only clear serum in the sealable annular chamber. If this ratio is too small, there will not be enough clear serum in the annular chamber 92 required for the subsequent diagnostic tests.

Through empirical evaluation of the respective volumes of the annular and the inner chambers 92 and 90 it has been determined that the preferable ratio of the annular chamber volume to the inner chamber volume is approximately 2.5/1. This ratio incorporates a buffer zone of clear serum within the inner chamber 90 to prevent the possible intrusion of the chyle into the annular chamber 92. However, if this buffer zone were eliminated, the ratio could be approximately 4.0/1.

It must be remembered that the total volume of the final configuration of the rotor liner 88 is dictated by the volume of the sample to be centrifuged, because, if the sample volume is too small for the rotor liner volume, the clear serum of the sample will not be separately held in the annular chamber since the sealable annular chamber 92 may receive both the chyle and the clear serum. In other words, the volume of recoverable clear serum from the sample must be at least the same or greater than the volume of the annular chamber 92.

The shape of the frustoconical section 48 in conjunction with its designed interface with the enlarged chamber portion 42 and the smaller chamber portion 46 is designed in such a manner that, when the forcing rod 72 has pushed the smaller chamber portion 46 to its position shown in phantom in FIG. 3, the liner will retain that configuration. Therefore, the forcing rod 72 can be removed with the collar section 58 of the reversing fixture 54 to allow the extraction of the final configuration of the rotor liner. It should be noted that during the movement of the forcing rod 72 in reversing the orientation of the reversing section 48 and causing a recessed orientation of the smaller portion chamber 46 within the larger chamber portion 42, the compressed air is released through the relief port of three way valve 82. All during the process the necessary air pressure must be maintained, however, within the rotor liner in order to securely hold portions of the interior of the rotor liner with the exception of the reversing section, so that no buckling will occur. Some slight deflection in the support area 52 of the liner will be experienced.

Although blow molding has been disclosed as the preferred method of establishing the intermediate product form 36, it should be recognized that other types of molding could be used, such as other forms of extrusion and injection molding processes. Furthermore, it may be possible for the particular unusual shape of the final configuration of the rotor liner to be formed through a process known as rotation molding. However, this is a very expensive and rather time consuming molding process which would render the production of the item uneconomical.

Although the disclosure herein shows a reversing fixture 54 in FIG. 3 for reversing the configuration of the reversing section 48, it is envisioned that the mold used in the molding process shown in FIG. 1 could incorporate a particular modification, so that the reversing process could be accomplished immediately subsequent to the initial blow molding process before the removal of the rotor liner from the initial molding operation.

Furthermore, the reversing fixture could be constructed in such a manner that the enlarged chamber portion 42 is moved toward the small chamber portion 46 which is maintained in a fixed position.

It is envisioned that the principles of the present invention could be used to form a rotor liner having more than one annular chamber, but changing the intermediate form mold and changing the reversing mechanism to pivot more than one reversing section.

What is claimed is:

1. A process for making a one piece generally enclosed convolute rotor liner having two chambers in fluid communication comprising the steps of:

molding an elongated member having at least two generally cylindrical shaped portions concentrically aligned along the rotational axis of said liner, one of said portions having a diameter greater than the other of said portions, said portions being integrally joined and longitudinally spaced from each other along said axis by a shifting section, said elongated member having a ridge located at the interface of said other cylindrical portion and said shifting section;

placing said other cylindrical portion within a mating recess of a forcing tool;

engaging said ridge with the forward annular rim of said forcing tool;

holding said one cylindrical portion in a stationary position;

moving said other cylindrical portion toward said one cylindrical portion;

pivoting said shifting section over said forward annular rim of said forcing tool to position said other cylindrical portion in a recessed position within said one cylindrical portion to form a central chamber surrounded by an annular chamber; and maintaining the shape of said other cylindrical portion while it is being moved into said recessed position within said one cylindrical portion.

2. A process as defined in claim 1 wherein said molding comprises blow molding.

3. A process for making a one piece generally enclosed convolute rotor liner having two chambers comprising the steps of:

molding an elongated member having at least two generally cylindrical shaped portions concentrically aligned along the rotational axis of said liner, one of said portions having a diameter greater than the other of said portions, said portions being integrally joined and longitudinally spaced from each other along said axis by a shifting section;

inserting said other of said portions in a recessed forcing tool having a forward annular rim;

moving said one of said portions by said forcing tool from a first position longitudinally spaced along said axis from said other of said portions to a second position with said other of said portions being generally recessed within said one of said portions while maintaining the shape of said other of said portions to form said rotor liner with a separate annular chamber surrounding an inner chamber; and pivoting said shifting section around said annular rim to form the wall of said annular chamber closest to said axis.

4. A process of making a one piece rotor liner having at least two chambers comprising the steps of:

forming an enclosed flexible liner with a single access port and defining two interior chamber portions with one of said portions being larger than the other of said chamber portions, said portions being united by a reversing section;

holding the exterior of said one chamber portion in a secure position to prevent movement of said one chamber portion;

inserting said other chamber portion within a recessed forcing tool having an annular rim surrounding said other chamber portion;

exerting a force on said other chamber portion of said liner in a direction toward said one chamber portion of said liner;

pivoting said reversing section over said annular rim of said forcing tool to move said reversing section from a first fixed position to a second fixed position;

moving said other chamber portion of said liner toward said one chamber portion of said liner to a recessed position within said one chamber while maintaining the shape of said other chamber portion to form a central chamber surrounded by an annular chamber; and forming a wall between said chamber portions.

* * * * *